United States Patent [19]

von Bonin

[11] Patent Number: 4,740,527

[45] Date of Patent: Apr. 26, 1988

[54] POROUS AND NON-POROUS INTUMESCENT MASSES

[75] Inventor: Wulf von Bonin, Leverkusen, Fed. Rep. of Germany

[73] Assignee: Bayer Aktiengesellschaft, Leverkusen, Fed. Rep. of Germany

[21] Appl. No.: 929,116

[22] Filed: Nov. 7, 1986

[30] Foreign Application Priority Data

Nov. 26, 1985 [DE] Fed. Rep. of Germany ....... 3541687

[51] Int. Cl.$^4$ ............................................. C08G 18/30
[52] U.S. Cl. .................................... 521/105; 521/108; 521/159; 521/165; 521/167; 521/173; 521/903; 521/906; 528/51; 528/52; 528/53; 528/66; 528/72; 528/76; 528/83
[58] Field of Search ............... 521/105, 108, 159, 165, 521/167, 173, 903, 906; 528/52, 51, 53, 66, 72, 76, 83

[56] References Cited

U.S. PATENT DOCUMENTS

| | | | |
|---|---|---|---|
| 3,943,076 | 3/1976 | Bell et al. ............................ | 521/906 |
| 4,338,412 | 7/1982 | von Bonin ........................... | 521/165 |
| 4,380,593 | 4/1983 | von Bonin et al. ................. | 521/165 |
| 4,514,328 | 4/1985 | Staendeke et al. .................. | 521/906 |
| 4,529,742 | 7/1985 | von Bonin et al. ................. | 521/107 |

FOREIGN PATENT DOCUMENTS 3302416 7/1984 Fed. Rep. of Germany .
3303702 8/1984 Fed. Rep. of Germany .

*Primary Examiner*—Maurice J. Welsh
*Assistant Examiner*—Sam A. Acquah
*Attorney, Agent, or Firm*—Sprung, Horn, Kramer & Woods

[57] ABSTRACT

A porous or non-porous intumescent mass comprising one or more carbonization auxiliaries, one or more fillers and optionally one or more other auxiliary agents, produced by the reaction of a polyisocyanate with an isocyanate reactive compound, optionally containing phosphorus or boron, in the presence of polyepoxide. The intumescent mass according to the invention having good fire characteristics and can be used to produce structural elements for fire resistance purposes, fire barriers, textile coatings, linings, laminates and pipe insulators.

20 Claims, No Drawings

POROUS AND NON-POROUS INTUMESCENT MASSES

BACKGROUND OF THE INVENTION

The present invention relates to optionally porous intumescent masses containing carbonization auxiliaries, fillers and optionally other auxiliary agents, obtainable by the reaction of isocyanate-reactive compounds, optionally containing phosphorus or boron with polyisocyanates in the presence of polyepoxides.

The intumescent masses according to the invention are distinguished by having surprisingly good fire characteristics in spite of being prepared without the use of special epoxide resin cross-linking agents.

Intumescent masses cross-linked with isocyanates have been known for some time (see DE-OS No. 3 306 698, DE-OS No. 3 302 416 and DE-OS No. 3 109 352). They combine satisfactory intumescence (i.e., formation of a flame-resistant carbonization foam when exposed to fire) with the practical advantage that when the liquid components of the reaction mixture are mixed together they form a relatively highly fluid material which can be applied by pouring or spraying and will then solidify within a matter of minutes, in some cases with the formation of a porous or foamy structure.

Intumescent masses based on epoxide resins, in particular on epoxide resin formulations which are hardened with amines, i.e., cold setting epoxide resin formulations, are also known (see DE-OS No. 3 303 702). The intumescence of such materials ranges from moderate to good, but the materials are particularly distinguished by the fact that the intumescent foam obtained from them has a high resistance to flame erosion, i.e., it is sufficiently solid to afford the necessary resistance to the oxidative and especially the mechanical stresses produced by the impact of burning gases at high temperatures and to ensure good or very good protection against the passage of heat.

At the same time, cold setting epoxide resins have such a long pot life i.e., the reaction mixture remains fluid for such a long time, that reaction mixtures which are sprayed at room temperature can only be applied in relatively thin layers to surfaces such as wall surfaces without running or dripping. It would be desirable to have an intumescent material which combines the good fire characteristics of epoxide resin intumescent masses with the advantages, for the purposes of practical application, of solidifying in the same manner as intumescent masses which are cross-linked with isocyanates.

Since the aminic hardeners of epoxide resin masses react instantly with isocyanates, it is not possible to use a combination of the two systems.

SUMMARY OF THE INVENTION

It has now surprisingly been found, however, that it is not necessary to use aminic epoxide resin hardeners in the aforesaid combination in order to achieve the desired fire characteristics. In other words, it has surprisingly been found that the epoxide component of the epoxide resins alone is sufficient to produce the advantageous fire characteristics of the epoxide resin intumescent masses.

This surprising finding forms the basis of the present invention, in which the polyepoxides are added to the isocyanate-cross-linked intumescent masses as carriers.

The present invention thus relates to optionally porous intumescent masses containing carbonization auxiliaries, fillers and optionally other auxiliary agents, obtainable by the reaction of polyisocyanates with isocyanate reactive compounds, optionally containing phosphorus or boron in the presence of polyepoxides.

The intumescent masses according to the invention are distinguished by their surprisingly advantageous performance during fire in spite of the fact that special epoxide resins are not used as cross-linking agents.

DETAILED DESCRIPTION OF THE INVENTION

By "carbonization auxiliaries" are meant additives which in the presence of fire assist the formation of a carbonization foam, e.g., they promote carbonization at the expense of distillative decomposition and may even catalyse it. When exposed to fire, such additives develop acidic components in the pyrolysis mixture, such as sulphuric acids, phosphoric acids or boric acids.

The carbonization auxiliaries are therefore substances such as, for example, acids, or salts, or their derivatives of sulphur, boron or phosphorus, preferably those with a low water-solubility, such as phosphates and polyphosphates of ammonia, ethylene diamine, melamine or alkanolamines, but boric acid and its salts, sulphates, elementary sulphur, phosphorus, phosphonic acids and phosphinic acids and their derivatives may also be used for this purpose.

The whole intumescent mass contains such carbonization auxiliaries in quantities of 5 to 65% by weight, preferably 9 to 40% by weight of the intumescent mass. These additives may be solid or liquid. Ethylene diaminophosphate, melamine phosphate, melamine pyrophosphate and ammonium polyphosphate are particularly preferred and esters of methylphosphonic acid and of phosphoric acid are also of interest.

The fillers used in the reaction mixture are in most cases substances which are insoluble in the reaction mixture. They may be substances such as melamine, urea, dicyandiamide and other cyanuric acid derivatives or their formaldehyde resins, which during fire evolve flame-resistant gases or assist in the formation of carbonization foam, or they may consist of organic aggregates such as sawdust, carbohydrates, pentaerythritol or other polyhydric alcohols and their oligomers, phenol resin powder, bituminous additives, graphites and graphite compounds, optionally foaming up at temperatures above 100° C., powdered coke and polymers in the form of powdered synthetic resins.

Inorganic substances which may be either anhydrous or contain water of crystallization or split off water may also be used as fillers. These may be metals, oxides, carbonates, sulphates, phosphates, borates or silicates such as glass or, for example, aluminium hydroxides, gypsum, chalk, dolomite, talcum, various types of mica, including those which can be expanded, as well as apatite, kaolin, calcium silicates and fuel ash. Glass beads and hollow silicate beads are particularly preferred, especially aluminium hydroxides which are capable of being dehydrated.

The fillers may be used as mixtures, as may also the other additives. They may be present in the form of powders, beads or hollow beads, and optionally also in the form of fibers. They may be added in quantities of from 0 to 80% by weight, preferably from 10 to 60% by weight, based on the intumescent mass.

Other auxiliary agents which may also be used, in most cases in quantities of less than 10% by weight, preferably from 0 to 5% by weight (based in the intumescent mass) include, for example, activators and catalysts such as tin, lead or cerium octoates or tert.-amines of the kind well known to the skilled artisan in accelerating isocyanate reactions, as well as surface-active agents, stabilizers, dyes, pigments, mold release agents, scented substances and bioactive materials such as fungistatic substances or rodent-repellents. Plasticizers may also be used, e.g., aromatic phosphoric acid esters.

The isocyanate reactive compounds used may be Zerewitinoff-active compounds of the kind well known to those skilled in the art of polyurethane chemistry. They are in most cases polyether or polyester polyols or polyamines, generally with a molecular weight of from 32 to 10,000, preferably from 200 to 6000.

Isocyanate reactive OH compounds or NH compounds which become accessible by opening of the epoxide ring of the polyepoxide resin component are also mentioned in the context of this invention.

Polyols containing phosphorus atoms are of particular interest, e.g., the following compounds containing hydroxyl groups:

esters of acids containing phosphorus such as phosphoric acids in various degrees of condensation up to the stage of metaphosphoric acid, or of phosphonic acids and phosphinic acids, e.g., their alkoxylation products and reaction products, salts of amines containing hydroxyl groups and the various phosphoric acids, and amides of various phosphoric acids containing hydroxyl groups or NH groups, or mixtures of the above.

The isocyanate reactive compounds used are advantageously compounds of the following types, optionally used as mixtures with other types of compounds:

condensation products containing phosphorus and having at least two hydroxyl groups, e.g., the compounds obtainable by the condensation of primary or secondary aliphatic, cycloaliphatic, aromatic, araliphatic or heterocyclic mono- and/or polyamines optionally containing OH groups, carbonyl compounds and dialkylphosphites, optionally followed by alkoxylation. Condensation products of this kind are known and have been disclosed, e.g., in DE-PS No. 1 143 022, U.S. Pat. No. 3,076,010, DE-AS No. 1 803 747 and DE-AS No. 1 928 265.

The isocyanate reactive compounds are contained in the whole intumescent mass in quantities of 3 to 50% by weight, preferably 5 to 30% by weight.

The polyepoxides to be used are known compounds. Examples of suitable polyepoxides already known to the skilled artisan in the preparation or formulation of epoxide resins are given below. Those derived from aromatic parent compounds have proved to be particularly suitable. Up to 70% by weight of the polyepoxides may be replaced by monoepoxides in the same manner as polyepoxide resins may in practice be partly replaced by so-called reactive diluents.

The reactive diluents are in most cases glycidyl ethers of substituted phenols, e.g., glycidyl ethers of phenyl phenol mixtures or cyclohexyl phenol mixtures.

The following are examples of known polyepoxides which are suitable for the present invention, those which are free from halogen being preferred.

These known polyepoxides include polyglycidyl ethers of polyhydric phenols, such as the polyglycidyl ethers of pyrocatechol, resorcinol or hydroquinone or of 4,4'-dihydroxydiphenylmethane, of 4,4'-dihydroxy-3,3'-dimethyldiphenylmethane, of 4,4'-dihydroxy-diphenyl-dimethylmethane (bisphenol A), of 4,4'-dihydroxy-diphenylmethane, of 4,4'-dihydroxy-diphenylcyclohexane, of 4,4'-dihydroxy-3,3'-dimethyl-diphenylpropane, of 4,4'-dihydroxydiphenyl, of 4,4'-dihydroxydiphenylsulphone, of tris-(4-hydroxyphenyl)-methane, of novolaks (i.e., of reaction products of monovalent or higher valent phenols with aldehydes, in particular formaldehyde, in the presence of acid catalysts), of diphenols obtained by the esterification of 2 mols of the sodium salt of an aromatic hydroxycarboxylic acid with 1 mol of a dihalogenalkane or dihalogendialkyl ether (see British Pat. No. 1 017 612), or of polyphenols obtained by the condensation of phenols with long chain halogenated paraffins containing at least 2 halogen atoms (see British Pat. No. 1 024 288).

The following are also suitable polyepoxides: glycidyl ethers of polyhydric alcohols, e.g., of 1,4-butanediol, 1,4-butenediol, glycerol, trimethylolpropane, pentaerythritol or polyethylene glycols.

The following may also be used: glycidyl esters of polybasic aromatic, aliphatic or cycloaliphatic carboxylic acids, e.g., diglycidyl phthalate, diglycidyl terephthalate, diglycidyl tetrahydrophthalate, diglycidyl adipate and diglycidyl hexahydrophthalate, optionally substituted with methyl groups; and glycidyl esters of reaction products of 1 mol of an aromatic or cycloaliphatic dicarboxylic acid anhydride and ½ mol of a diol or 1/n mol of a polyol containing n hydroxyl groups, such as glycidyl carboxylic acid esters corresponding to the following general formula

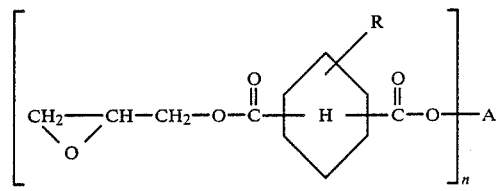

wherein A denotes an at least divalent residue of an aliphatic hydrocarbon optionally interrupted by oxygen and/or by cycloaliphatic rings, or the divalent residue of a cycloaliphatic hydrocarbon; R denotes hydrogen or an alkyl group having 1 to 3 carbon atoms, and n denotes a number having a value from 2 to 6; or mixtures of glycidyl carboxylic acid esters corresponding to the above general formula (see British Pat. No. 1 220 702).

The following are particularly preferred: 1,2-polyepoxides containing at least one tertiary nitrogen atom per molecule, e.g. bis-(N-epoxypropyl)-aniline, bis-(N-epoxypropyl)-butylamine, bis-(N-epoxypropyl)-4-aminophenylglycidyl ether, triglycidyl isocyanurate, triglycidylurazoles, N,N'-diepoxy-propyloxamide, triglycidyl-1,2,4-triazolidine-zolidine-3,5-diones according to DE-OS No. 2 935 354, glycidyl-1,2,4-triazolidine-3,5-diones containing 2 to 10 glycidyl groups according to DE-OS No. 3 027 623 N,N'-diglycidyl-bis-hydantoinyl compounds according to DE-AS No. 1 670 490, N,N'-diglycidyl compounds of cyclic ureide according to British Pat. No. 1 148 570, DE-PS No. 2 263 492 and DE-AS No. 1 954 503, polyurethane diglycidyl ethers according to U.S. Pat. No. 2,830,038, DE-AS No. 1 947 001 and DE-AS No. 1 966 182 and diglycidyl esters containing imide groups according to DE-AS No. 2 306 403.

The above mentioned 1,2-polyepoxides containing at least one tert.-nitrogen atom per molecule may be mixed with 1,2-polyepoxides which are free from nitrogen, in particular with polyglycidyl ethers of polyvalent phenols, e.g. of bisphenol A. Preferred intumescent masses which are free from solvent contain, as one of their components, 0 to 80% by weight of a 1,2-polyepoxide containing at least one tert.-nitrogen atom per molecule and 20 to 100% by weight of an aromatic 1,2-polyepoxide which is free from nitrogen.

The 1,2-polyepoxides, especially those which are solid, may also be mixed with other reactive diluents to lower their viscosity, e.g., with liquid monoepoxides such as phenyl glycidyl ethers, tert.-butyl phenyl glycidyl ethers, allyl glycidyl ethers, etc.

It is preferred to use polyepoxides or polyepoxide mixtures based on bisphenol-A-bis-glycidyl ether and its oligomers.

The intumescent masses according to the invention contain the polyepoxide in quantities of 5 to 50% by weight, preferably 10 to 35% by weight of the intumescent mass.

The reaction mixture according to the invention is reacted with polyisocyanates.

The quantity of isocyanate used is determined by the number of equivalents required by the isocyanate reactive compounds in the reaction mixture. Since all the components of the reaction mixture are hygroscopic or contain water of adsorption, the reaction mixture will invariably contain moisture (optionally masked by the addition of dry zeolite) and in some cases this moisture content may even be desired and added deliberately in order to produce a certain porosity in the intumescent masses. This moisture content must be taken into account, possibly by carrying out a water determination by the usual methods e.g., by titration according to K. Fischer, optionally after azeotropic removal of water. The quantity of polyisocyanate put into the process should amount to 70 to 200% by weight, preferably 90 to 140% by weight of the stoichiometrically required quantity of isocyanate.

The polyisocyanates used as starting material may in principle be those known from the chemistry of polyurethanes, such as aliphatic, cycloaliphatic, araliphatic, aromatic and heterocyclic polyisocyanates of the kind described by W. Siefken in *Justus Liebiqs Annalen der Chemie,* 562, pages 75 to 136, for example those corresponding to the formula Q(NCO)$_n$ wherein n=2–4, preferably 2, and Q denotes an aliphatic hydrocarbon group having 2–18, preferably 6–10 carbon atoms, a cycloaliphatic hydrocarbon group having 4–15, preferably 5–10 carbon atoms, an aromatic hydrocarbon group having 6–15, preferably 6–13 carbon atoms, or an araliphatic hydrocarbon group having 8–15, preferably 8–13 carbon atoms.

The following are examples: ethylene diisocyanate, 1,4-tetramethyldiisocyanate, 1,6-hexamethylenediisocyanate, 1,12-dodecanediisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (DE-Auslegeschrift No. 1 202 785, U.S. Pat. No. 3,401,190), 2,4- and 2,6-hexahydrotolylene diisocyanate and any mixtures of these isomers, hexahydro-1,3- and/or 1,4-phenylenediisocyanate, perhydro-2,4'-and/or 4,4'-diphenylmethane diisocyanate, 1,3- and 1,4-phenylenediisocyanate, 2,4- and 2,6-tolylenediisocyanate and any mixtures of these isomers, diphenylmethane-2,4'-and/or 4,4'-diisocyanate and naphthylene-1,5-diisocyanate.

The following are further examples of compounds which may be used according to the invention: triphenylmethane-4,4',4"-triisocyanate, polyphenylpolymethylene polyisocyanates which are obtainable by the condensation of aniline with formaldehyde followed by phosgenation and have been described, for example, in GB Pat. Nos. 874 430 and 848 671, m- and p-isocyanatophenylsulphonyl isocyanates according to U.S. Pat. No. 3,454,606, perchlorinated arylpolyisocyanates of the kind described, for example, in DE-Auslegeschrift No. 1 157 601 (U.S. Pat. No. 3,277,138), polyisocyanates containing carbodiimide groups as described in DE-Pat. No. 1 092 007 (U.S. Pat. No. 3,152,162) and in DE-Offenlegungsschriften Nos. 2 504 400, 2 537 685 and 2 552 250, norbornandiisocyanates according to U.S. Pat. No. 3,492,330, polyisocyanates containing allophanate groups as described e.g. in GB Pat. No. 994 890, BE Pat. No. 761 626 and NL Pat. No. 7 102 524, polyisocyanataes containing isocyanurate groups as described, e.g.,in U.S. Pat. No. 3,001,973, DE Pat. Nos. 1 022 789, 1 222 067 and 1 027 394 and in DE-Offenlegungsschriften Nos. 1 929 034 and 2 004 048, polyisocyanates containing urethane groups as described, e.g., in BE Pat. No. 752 261 or in U.S. Pat. Nos. 3,394,164 and 3,644,457, polyisocyanates containing acylated urea groups as described in DE-Pat. No. 1 230 778, polyisocyanates containing biuret groups as described, e.g., in U.S. Pat. Nos. 3,124,605, 3,201,372 and 3,124,605 and in GB Pat. No. 889 050, polyisocyanates prepared by telomerisation reactions, as described, e.g., in U.S. Pat. No. 3,654,106, polyisocyanates containing ester groups, as described, e.g., in GB Pat. Nos 965 474 and 1 072 956, in U.S. Pat. No. 3,567,763 and in DE Pat. No. 1 231 688, reaction products of the above mentioned isocyanates with acetals according to DE Pat. No. 1 072 385 and polyisocyanates containing polymeric fatty acid esters according to U.S. Pat. No. 3,455,883.

The distillation residues obtained from the commercial production of isocyanates and containing isocyanate groups may also be used, optionally as solutions in one or more of the above mentioned polyisocyanates. Any mixtures of the above mentioned polyisocyanates may also be used.

It is generally preferred to use technically readily available polyisocyanates, e.g., 2,4- and 2,6-tolylene diisocyanate and any mixtures of these isomers ("TDI") but especially polyisocyanates of the MDI type, namely 4,4'- and/or 2,4'-diphenylmethane diisocyanate and/or polyphenylpolymethylene polyisocyanates of the kind prepared by aniline-formaldehyde condensation followed by phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates which are derived from 2,4- and/or 2,6-tolylene diisocyanate or from 4,4'- and/or 2,4'-diphenyl methane diisocyanate.

A proportion of monoisocyanates may also be used (up to but not more than 30% by weight, based on the polyisocyanate).

According to the invention, the optionally porous intumescent materials are preferably of the kind obtained by the reaction of 1. Polyisocyanates of the MDI type with (based on the total quantity of intumescent material)
2. 5–30% by weight of phosphorus-containing condensation products carrying at least two hydroxyl groups, obtainable by the condensation of primary or secondary aliphatic, cycloaliphatic, aromatic, araliphatic or heterocyclic mono- and/or polyamines, optionally containing OH groups, carbonyl compounds and dialkyl phosphites, optionally followed by alkoxylation, and
3. 9–40% by weight of carbonization auxiliaries based on ammonium polyphosphates and/or melamine phosphates and
4. 10–60% by weight of inorganic fillers, preferably of the type which can be dehydrated, and
5. 0–5% by weight of catalysts, color pigments and stabilizers and
6. 10 to 35% by weight of polyepoxides or polyepoxide mixtures based on bisphenol-A-glycidyl ethers.

The intumescent materials according to the invention in which the intumescent properties have excellent resistance to water may be solid or porous or have a foam structure. They have densities ranging on average from about 0.03 to 1.8 $g/m^3$, preferably 0.1 to 1.0 and especially 0.2 to 0.8 $g/m^3$.

Structural elements for fire resistance purposes may consist exclusively of the intumescent materials described above but may advantageously constitute combination materials and/or contain other assembly aids or coating auxiliaries and additives improving their processing qualities or applications for special purposes, e.g., reinforcing elements and/or carrier substrates.

Preparation of the intumescent materials according to the invention may be carried out continuously or batchwise.

The intumescent masses may be prepared in a solvent but are preperably prepared solvent-free. Foams are of particular interest and may have unit weights of about 40 to 900 $kg/m^3$, preferably 180 to 700 $kg/m^3$. Foams obtainable according to the invention having unit weights of about 200 to 600 $kg/m^3$ constitute a particularly advantageous combination of low unit weight, which is desirable for purposes of insulation, and sufficient mass per unit volume to enable the substance to foam up in contact with fire.

The various starting materials may be brought together singly although it is particularly advantageous to prepare a preliminary mixture containing all the necessary components with the exception of the polyisocyanate and of any catalyst used. The intumescent masses according to the invention may thus be formulated as two-component mixtures and prepared from these mixtures. The usual apparatus employed in polyurethane technology are suitable for this purpose.

Other components of the formulation may well be added to the previously prepared preliminary mixture or to the isocyanate, e.g., substances such as urea, urea condensates, formaldehyde condensates, phenol resin, phosphates, aminopolyphosphates, phosphoric acid esters such as tricresylphosphate or dibutylcresylphosphate, aluminium hydroxides, powdered glass, vermiculites, solid or hollow glass beads or other silicate beads and other additives capable of modifying the fire characteristics.

The addition of substances capable of increasing the foaming effect in the event of fire may also be included in the formulation for preparing the intumescent masses according to the invention. Such additives include, for example, aliphatic and in particular aromatic hydroxy carboxylic acids such as salicylic acid or p-hydroxybenzoic acid, PVC, carbohydrates and substances which liberate gases such as nitrogen or carbon dioxide or water at elevated temperatures, e.g., triazoles or azodicarbonamides, sulphhydrazides or urea dicarboxylic acid anhydride, nitroso compounds, compounds containing water of hydration or interstitial water, nitric acid, carbonic acid, paraffins, graphite, urea or zeolites.

The intumescent masses according to the invention may be used to manufacture molded articles or linings or coverings which foam up at temperatures of about 200° to 350° C. to prevent the spread of fire. These products may be produced, for example, by incorporating the intumescent masses or spreading them on textiles of organic or inorganic fibres or by spraying the masses or moulding or casting and setting them and cutting them up or melting them. The products thus obtained may be used as sealing elements, safety devices and fire barriers. They may also be used for sealing joints, breaks in cables and openings in walls. For such purposes, the intumescent mass may also be made up into a kind of concrete by mixing it with stones and/or expanded particles such as expanded clay or glass, vermiculite, perlite, etc. and/or foam beads based, for example, on polystyrene.

The new intumescent masses, which may be flexible, may also be used for the production of fire-resistant upholstery coatings and linings and textile coatings and laminates.

The masses may also be used to produce coatings of almost any thickness, optionally with reinforcements, on metal objects such as steel girders and panels, on wooden objects such as door panels and roof beams, on brickwork, and on plastics products such as cable insulations, fuel tanks, containers or foam panels. Fire retarding panels or wall elements may easily be produced by applying the coatings to a weight-bearing panel or supporting construction, e.g., in or on a panel of drawn metal or a honeycomb panel of metal, cardboard, paper, wood, ceramics or plastics.

The intumescent masses may also be used for the manufacture of anti-noise linings or soundproof elements or for the purposes of energy absorption.

Internal coatings may also be applied to fire retardant doors to foam up in the event of fire and act as an insulation. The material may also be used to form seals in doors or other objects to foam up in the event of fire and seal off the gap situated in front of the material. Sections used for sealing, e.g., of an elastic material, may also be filled or backfilled with the intumescent masses according to the invention to seal off against fire. By suitably arranging the intumescent masses, they may form barriers in chimneys, ventilation and air conditioning plants, pipe conduits and inlet and outlet openings. These barriers prevent or retard the passage of gases when heated to about 300° C. to 400° C. The arrangements for this purpose may consist, for example, of stacks of parallel plates arranged at close intervals, screens or perforated shutters coated with the intumescent masses, or pipe sections loosely filled with granulates of the intumescent masses, or pipes and internal coatings made of the intumescent masses according to the invention. The optionally foamed intumescent masses may also be used as gas filter elements which close up when the temperature rises too high.

The fire resistance of hollow sections of metal, wood or plastics may also be improved by filling the sections with the intumescent masses.

Molded bodies, for example, which may easily be produced from the intumescent masses, or granulates in various particle sizes may be foamed up in one or more stages by heating them to temperatures above 200° C., preferably temperatures from 250° to 1000° C., in particular 300° to 800° C. The foaming may be unrestricted or it may be carried out in closed or open molds which should have openings for the escape of steam and air.

Fire repellent foams, so-called carbonization foams are obtained by this procedure.

The intumescent masses according to the invention may also be applied to support materials and foamed up there, e.g., by coating expanded clay particles with the intumescent masses and then pouring the particles into a mould and heating them there to form a block of expanded clay embedded in carbonisation foam. A coated wooden or iron panel may be used to produce a foam combination panel at about 250° C., and the foam surface of the panel may then be covered by another wooden or iron panel.

The masses may also be foamed up in cavities, e.g., in cable shafts as well as in bricks and other building material, e.g., by introducing the reaction mixtures or the finished foam intumescent masses in suitable quantities into the cavity, either when the building material is cold or when it is still hot.

The intumescent masses according to the invention may also be used in the form of pipe half shells or full coverings for insulating pipes and cables. It is of some interest that this insulation may also be carried out in situ by coating the pipe or other part to be insulated with the reaction mixture and, if desired, foaming up the mixture.

Preparation and processing of the reaction mixtures used for producing the intumescent masses may be carried out continuously or discontinuously. The components may be brought together singly or as mixtures. It is preferred to add all the components together with the exclusion of the isocyanate so that the product may subsequently be used as a two-component formulation, e.g., in conventional manual stirrer vessels with mechanical stirrers, in mixing heads with stirrers, nozzles or mixing jets, or in static mixers of the type also known from polyurethane chemistry. The reaction may be carried out in cold, cooled or heated (from 25° to about 100° C.) molds with or without pressure. Two component cartridges may also be used.

The intumescent masses according to the invention are distinguished by the fact that they retain their intumescent properties even under the action of running water. They generally begin to foam up at temperatures above 200° C., in particular above 300° C. They expand by 100 to over 1000 volumes-% in the fire, depending on the composition and the manner of heating. They may advantageously be formulated without halogens and may in many cases be formulated to be difficultly flammable.

The constructional elements obtainable according to the invention for fire protection are used particularly wherever some measure of fire protection is to be carried out by coating, lining, insulating, separating, panelling or sealing off cavities or structural parts in building construction, underground construction, electrotechnology and the construction of vehicles, machinery or plants and wherever the presence of water is to be expected in the form of water of condensation, rain water, ground water or water used for mixing mortar or cement.

The invention is described below by way of example. The parts given are parts by weight or percentages by weight unless otherwise indicated.

The following are examples of types of polyisocyanates used:

1. Polyisocyanates

Type A: Commercial 4,4'-diphenylmethanediisocyanate containing isomers and about 10% of higher functional multinuclear components. Isocyanate content about 31% by weight.

Type B: Similar isocyanate containing about twice the proportion of higher condensed components, isocyanate content about 31% by weight.

Type C: Similar isocyanate in which the proportion of higher condensed components is about doubled again. Isocyanate content about 31% by weight.

2. The following are examples of commercial products, represented in their idealized structure, used as phosphorus-containing condensation products for the reaction with isocyanates:

Type K: $(C_2H_5O)_2POCH_2N(C_2H_4OH)_2$

Type L: $(CH_3O)_2POCH_2N(C_3H_6OH)_2$ (isopropyl type)

Type PE: Polyethylene glycol started on glycerol (polyether). OH number about 250.

3. Carbonization auxiliary

Type MP: Melamine orthophosphate

Type MPP: Melamine pyrophosphate

Type NPP: Ammonium polyphosphate

4. Fillers

Type AO: Apyral ® B 2 (Al-hydroxide of Bayer AG) mean particle size 20–25 $\mu$m, BET surface area 0.2 $m^2/g$.

Type GP: Microglass beads, diameter 75–100 micron

Type HP: Aluminosilicate hollow beads, diameter about 250 micron, about 300 g/l

Type CC: Chalk Calcidar 40, (Omia, Cologne)

5. Catalysts and other additives

Type SO: Tin octoate

Type OS: Polyether siloxane pore stabilizer

Type BF: Iron oxide pigment

Type W: Water (natural water content or added)

Type G: Glycerol

6. Polyepoxides

Type 20: Bisphenol A-bis-glycidyl ether

Type 80: oligomeric type 20

Type 22: Mixture of type 80 and an alkyl phenyl glycidyl ether 60:40

Type 60: Epoxide resin based on aniline (Lekutherm ® X 50, Bayer AG)

Type 25: 1:1 mixture type 20 and type 50

Type 10: Hexahydrophthalic acid-bis-glycidyl ester

General method of preparation:

Components 2 to 6 are stirred together to form a preliminary mixture into which component 1 is stirred at room temperature. After the reaction mixture has been stirred for about 10 seconds, it is poured into a plate mould where it solidifies within a few minutes, in some cases with foaming. Subsequent use is carried out after a storage time of about 24 hours.

The Examples which follow are summarized in a Table.

| Example No. | 1 | 2 | 3 | 4 | 5 | 6 | 7 | 8 | Comparison |
|---|---|---|---|---|---|---|---|---|---|
| Component (parts by weight) Type | | | | | | | | | |
| 1. A |  |  | 155 |  |  |  | 60 |  |  |
| B |  | 125 |  |  |  | 140 |  |  |  |
| C | 125 |  |  | 160 | 145 |  | 100 | 35 | 120 |
| 2. K | 100 |  | 50 | 100 | 100 | 100 |  | 18 | 100 |
| L |  | 100 | 50 |  |  |  |  |  |  |
| PE |  |  | 50 |  |  |  |  | 17 |  |
| 3. MP |  | 75 | 25 |  |  |  |  |  |  |
| MPP |  | 70 |  |  | 25 |  |  |  |  |
| NPP | 125 |  | 100 | 125 | 125 | 175 | 125 | 70 | 100 |
| 4. AO | 125 | 100 | 80 | 50 | 150 | 172 | 125 | 70 | 100 |
| GP |  |  |  | 100 |  |  |  |  |  |
| HP |  |  | 20 |  |  |  |  |  |  |
| CC |  | 25 |  | 10 |  |  | 20 | 30 |  |
| 5. SO | 0.5 | 0.6 | 0.5 | 0.5 | 1.5 | 1.5 | 0.4 | 3 |  |
| OS |  | 0.01 |  |  |  | 0.02 |  |  |  |
| BF | 2 | 2.5 | 3 | 2 | 3 | 3 | 2 | 1.5 | 0.4 |
| W | 0.7 | 0.8 | 0.9 | 0.8 | 1.0 | 1.1 | 0.8 |  |  |
| G |  |  |  |  |  |  | 10 |  |  |
| 6. 20 | 100 |  |  |  |  |  | 120 |  |  |
| 80 |  |  |  |  |  | 200 |  |  |  |
| 22 |  | 100 |  |  |  |  |  | 70 |  |
| 50 |  |  | 100 |  |  |  |  |  |  |
| 25 |  |  |  | 100 |  |  |  |  |  |
| 10 |  |  |  |  | 200 |  |  |  |  |
| Flame exposure of intumescent (cubes) | 2 | 3 | 3 | 3 | 4 | 3 | 2 | 2 | 1-2 |
| Intumescence 450° C. | 5 | 5 | 4 | 4 | 5 | 5 | 5 | 3 | 3 |

The intumescent panels prepared as described were cut up into cubes having a length of side of 1 cm and introduced into a circulating air cupboard which had been preheated to 450° C. The samples were removed from the oven after 30 minutes and the increase in volume determined. The intumescence properties were assessed as follows:

| Increase in volume in % | Intumescence 450° C. |
|---|---|
| above 500 | 1 |
| about 400–500 | 2 |
| about 300–400 | 3 |
| about 200–300 | 4 |
| below 200 | 5 |

The assessment of the intumescent panels 1 to 16 is noted in the Table. The Table also shows the assessment of intumescence of similar cubes measuring 0.5 cm placed on a wire gauze and exposed to the non-luminous flame of a natural gas bunsen burner from above for 3 minutes.

The flames on the test samples extinguished immediately after removal of the burner flame in all cases, leaving a carbonisation foam which did not continue to glow.

The test result observed was exactly the same when the test samples had previously been kept under running water for 12 days at room temperature (RT) and dried before being tested. This demonstrates the good water resistance of the intumescent panels.

The intumescent foam produced when the cube was exposed to a flame was tested for its mechanical strength by means of a ram having a surface area of 5 mm$^2$ by placing the ram on the foam, initially without any weight being applied to the foam and then with increasing application of weight until the ram broke into the intumescent foam. The weight required for breaking into the foam is a measure of the strength of the foam. Since the geometrical structure of the intumescent foam produced on exposure to the flame cannot be controlled, the results obtained from this method vary and even when the test is repeated 10 times they only indicate a trend which is, however, relatively revealing.

When the Comparison sample and Examples 1 to 8 are tested, it is found that the intumescent foams formed in Examples 1 to 8 are about 4 to 6 times firmer than those obtained from the Comparison sample which was produced without polyepoxides.

If the sample cubes are left to foam up in a crucible oven preheated to 700° C. and left to glow with access of air for 60 minutes, the residual volume is about three times higher in Examples 1 to 8 than in the Comparison sample.

This shows the superior fire characteristics of the intumescent materials according to the invention.

What is claimed is:

1. An intumescent mass consisting essentially of one or more carbonization auxiliaries and one or more fillers, said mass produced by reacting a polyisocyanate with an isocyanate reactive compound in the presence of a polyepoxide.

2. An intumescent mass according to claim 1, wherein said mass further consisting essentially of one or more other auxiliary agents.

3. An intumescent mass according to claim 1, wherein said isocyanate reactive compound contains phosphorus.

4. An intumescent mass according to claim 1, wherein said isocyanate reactive compound contains boron.

5. An intumescent mass according to claim 1, wherein said carbonization auxiliary is an acid, salt or a derivative of an acid or salt of sulphur, boron or phosphorus.

6. An intumescent mass according to claim 1, wherein said carbonization auxiliary is a phosphate or polyphosphate of ammonia, ethylene diamine, melamine or alkanolamine or boric acids and its salts, sulphates, elementary sulphur, phosphorous, phosphonic acid and phosphinic acids.

7. An intumescent mass according to claim 1, wherein said carbonization auxiliary is selected from the group consisting of ethylene diaminophosphate, melamine phosphate, melamine pyrophosphate, ammonium polyphosphate, esters of methylphosphonic acid and esters of phosphoric acids.

8. An intumescent mass according to claim 1, wherein said carbonization auxiliary is in a quantity of 5 to 65% by weight, based on the weight of the intumescent mass.

9. An intumescent mass according to claim 1, wherein said carbonization auxiliary is in a quantity of 9 to 40% by weight, based on the weight of the intumescent mass.

10. An intumescent mass according to claim 1, wherein said filler is selected from the group consisting of melamine, urea, dicyandiamide, sawdust, carbohydrates, pentaerythritol, phenol resin powder, bituminous additives, graphite, powdered coke, powdered synthetic resins, aluminium hydroxides, gypsum, chalk, dolomite, talcum, mica, apatite, kaolin, calcium silicates, fuel ash, glass beads and hollow silicate beads.

11. An intumescent mass according to claim 1, wherein said fillers are in quantities of 10 to 60% by weight, based on the weight of the intumescent mass.

12. An intumescent mass according to claim 2, wherein said other auxiliary agent is selected from the group consisting of tin, lead octoates, surface-active agents, stabilizers, dyes, pigments, mold release agents, scented substances, fungistatic substance, rodent-repellents and plasticizers.

13. An intumescent mass according to claim 1, wherein the isocyanate reactive compound is selected from the group consisting of polyethers, polyester polyols and polyamines, said isocyanate reactive compound having a molecular weight of 200 to 6000.

14. An intumescent mass according to claim 1, wherein the isocyanate reactive compound is contained in a quantity of 3 to 50% by weight, based on the weight of the intumescent mass.

15. An intumescent mass according to claim 1, wherein the polyepoxide is contained in a quantity of 5 to 50% by weight, based on the weight of the intumescent mass.

16. An intumescent mass according to claim 1, wherein the polyepoxide is contained in a quantity of 10 to 35% by weight, based on the weight of the intumescent mass.

17. An intumescent mass according to claim 1, wherein the polyepoxide is a polyglycidyl ester of a polyhydric phenol.

18. An intumescent mass according to claim 1, wherein the polyepoxide is selected from the group consisting of bis-(n-epoxypropyl)-aniline, bis-(N-epoxypropyl)-butylamine, bis-(N-epoxypropyl)-4-aminophenylglycidyl ether, triglycidyl isocyanurate, triglycidyl-urazoles, N,N'-diepoxy-propyloxamide, triglycidyl-1,2,4-triazolidine-3,5 diones, glycidyl-1,2,4-triazolidine-3,5-diones containing 2 to 10 glycidyl groups, N,N'-diglycidyl-bis-hydantoinyl compounds N,N'-diglycidyl compounds of cyclic ureide, polyurethane diglycidyl ethers and diglycidyl esters containing imide groups.

19. An intumescent mass according to claim 1, produced by the reaction of
   (a) a polyisocyanate of the MDI type with, based on the total intumescent mass,
   (b) 5 to 30% by weight of a phosphorus-containing condensation product having at least two hydroxyl groups and produced by the condensation of primary or secondary aliphatic, cycloaliphatic, aromatic, araliphatic or heterocyclic monoamines or polyamines and
   (c) 10 to 35% by weight of polyepoxides or polyepoxide mixtures based on bisphenol-A-glycidyl ethers and
   (d) 9 to 40% by weight of carbonization auxiliaries based on ammonium polyphosphates, melamine phosphates, or mixtures thereof,
   (e) 10 to 60% by weight of inorganic fillers and
   (f) 0 to 5% by weight of catalysts, color pigments and stabilizers.

20. An intumescent mass according to claim 19, wherein the condensation is followed by alkoxylation.

* * * * *